United States Patent
Chasser et al.

(10) Patent No.: US 10,221,328 B2
(45) Date of Patent: Mar. 5, 2019

(54) CURABLE FILM-FORMING COMPOSITIONS PREPARED FROM POLYMERS DERIVED FROM BENZOIC ACID

(71) Applicant: PPG INDUSTRIES OHIO, INC., Cleveland, OH (US)

(72) Inventors: Anthony M Chasser, Allison Park, PA (US); Shanti Swarup, Allison Park, PA (US); John E Schwendeman, Wexford, PA (US); John Furar, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1064 days.

(21) Appl. No.: 14/158,882

(22) Filed: Jan. 20, 2014

(65) Prior Publication Data

US 2015/0203706 A1 Jul. 23, 2015

(51) Int. Cl.
*C09D 133/06* (2006.01)

(52) U.S. Cl.
CPC ...... *C09D 133/068* (2013.01); *C08L 2312/00* (2013.01); *Y10T 428/31935* (2015.04)

(58) Field of Classification Search
None
See application file for complete search history.

(56) References Cited

U.S. PATENT DOCUMENTS

| 4,031,051 A | 6/1977 | Dowbenko et al. |
| 5,959,037 A | 9/1999 | Saito et al. |
| 2007/0218274 A1 | 9/2007 | Kania et al. |
| 2008/0124474 A1* | 5/2008 | Vijverberg ......... C09D 133/068 427/386 |
| 2011/0281115 A1 | 11/2011 | Kania et al. |

* cited by examiner

*Primary Examiner* — Sheeba Ahmed
(74) *Attorney, Agent, or Firm* — Krisanne Shideler

(57) ABSTRACT

The present invention is directed to curable film-forming compositions comprising:
  (a) a polymeric acrylic binder having reactive functional groups, wherein the polymeric acrylic binder is prepared from an ethylenically unsaturated, epoxy functional monomer that is reacted with benzoic acid; and
  (b) a curing agent containing functional groups that are reactive with reactive functional groups on the polymeric acrylic binder. Also provided is a multilayer coated substrate comprising: a substrate; a colored basecoat applied to at least a portion of a surface of the substrate; and a clearcoat applied to at least a portion of the basecoat, wherein the clearcoat is deposited from the curable film-forming composition described above.

9 Claims, No Drawings

CURABLE FILM-FORMING COMPOSITIONS PREPARED FROM POLYMERS DERIVED FROM BENZOIC ACID

FIELD OF THE INVENTION

The present invention relates generally to curable film-forming compositions that contain polymeric acrylic binders derived from benzoic acid.

BACKGROUND OF THE INVENTION

In the past twenty years a great deal of research effort in the coatings industry has been focused on acid etch resistance of transparent coatings. Acrylic urethane clear coats can have excellent acid etch resistance but in the automotive refinish coatings industry, which requires coatings to cure at ambient temperatures, acrylic coatings that are designed for etch resistance in OEM applications are often too soft for practical use.

It would be desirable to develop curable film-forming compositions which cure at ambient temperatures and provide excellent acid etch resistance, while maintaining other physical properties.

SUMMARY OF THE INVENTION

The present invention is directed to curable film-forming compositions comprising:

(a) a polymeric acrylic binder having reactive functional groups, wherein the polymeric acrylic binder is prepared from an ethylenically unsaturated, epoxy functional monomer that is reacted with benzoic acid; and (b) a curing agent containing functional groups that are reactive with reactive functional groups on the polymeric acrylic binder.

Also provided is a multilayer coated substrate comprising: a substrate; a colored basecoat applied to at least a portion of a surface of the substrate; and a clearcoat applied to at least a portion of the basecoat, wherein the clearcoat is deposited from the curable film-forming composition described above.

DETAILED DESCRIPTION OF THE INVENTION

It is noted that, as used in this specification and the appended claims, the singular forms "a," "an," and "the" Include plural referents unless expressly and unequivocally limited to one referent.

Other than in the operating examples, or where otherwise indicated, all numbers or expressions referring to quantities of Ingredients, reaction conditions, etc., used in the specification and claims are to be understood as modified in all instances by the term 'about'. Various numerical ranges are disclosed in this patent application. Because these ranges are continuous, they include every value between the minimum and maximum values. Unless expressly indicated otherwise, the various numerical ranges specified in this application are approximations.

The various embodiments and examples of the present invention as presented herein are each understood to be non-limiting with respect to the scope of the invention.

As used in the following description and claims, the following terms have the meanings indicated below:

The terms "acrylic" and "acrylate" are used interchangeably (unless to do so would alter the intended meaning) and include acrylic acids, anhydrides, and derivatives thereof, such as their C1-C5 alkyl esters, lower alkyl-substituted acrylic acids, e.g., C1-C5 substituted acrylic acids, such as methacrylic acid, ethacrylic acid, etc., and their C1-C5 alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

The term "polymer" is meant to encompass oligomers, and includes without limitation both homopolymers and copolymers.

The present invention is directed to curable film-forming compositions. The curable film-forming compositions may be curable at ambient temperatures or elevated temperatures, depending on the crosslinking chemistry employed. The film-forming compositions of the present invention are most suitable as topcoats, in particular, clear coats and monocoats. The compositions may be easily prepared by simple mixing of the ingredients, using formulation techniques well known in the art.

The film-forming compositions comprise (a) a polymeric acrylic binder having reactive functional groups. The polymeric acrylic binder is prepared from an ethylenically unsaturated, epoxy functional monomer that is reacted with benzoic acid. Note that the benzoic acid is unsubstituted; i.e., it has no substituents attached to the aromatic ring, such as hydroxyl groups, thiol groups, or amine groups.

Examples of ethylenically unsaturated epoxy functional monomers that may be reacted with benzoic acid include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are preferred.

The ethylenically unsaturated epoxy functional monomer may be reacted with the benzoic acid to form an ethylenically unsaturated, aromatic, hydroxyl functional monomer, prior to preparation of the polymeric acrylic binder. The ethylenically unsaturated, aromatic, hydroxyl functional monomer may then be polymerized with other ethylenically unsaturated monomers such as acrylic monomers and vinyl monomers to form the polymeric acrylic binder.

Suitable acrylic monomers include alkyl esters of acrylic acid or methacrylic acid. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

In alternative embodiment of the present invention, the ethylenically unsaturated epoxy functional monomer may be polymerized with the other ethylenically unsaturated monomers to yield an acrylic polymer having epoxy functional groups, and then an aromatic, hydroxyl functional repeat unit is formed on the polymeric acrylic binder upon post-reaction of the epoxy functional groups with benzoic acid. Typically, the aromatic, hydroxyl functional repeat unit formed upon reaction of the epoxy group with the benzoic acid constitutes at least 20 percent by weight of the polymeric acrylic binder, such as 20 to 50 percent by weight of the polymeric acrylic binder, or 25 to 50 percent by weight of the polymeric acrylic binder, or 30 to 40 percent by weight of the polymeric acrylic binder, based on the total weight of resin solids in the acrylic polymeric binder.

The acrylic polymer can include other hydroxyl functional groups, which are often incorporated into the polymer by including one or more hydroxyl functional monomers in the reactants used to produce the acrylic polymer, different from the aromatic, hydroxyl functional repeat unit formed as described above. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl)acrylamides and N-(alkoxymethyl)methacrylamides.

Examples of other reactive functional groups that may be on the polymeric acrylic binder include carbamate groups, carboxyl groups, isocyanate groups, carboxylate groups, primary amine groups, secondary amine groups, amide groups, urea groups, urethane groups, epoxy groups, and combinations thereof. Such reactive functional groups may be incorporated into the polymeric acrylic binder by using monomers having the desired functional groups during polymerization, or by pre- or post-reacting groups on monomers or repeat units with compounds that will yield the desired reactive functional groups, using techniques known in the art. For example, carbamate functional groups can be included in the acrylic polymer by copolymerizing the acrylic monomers with a carbamate functional vinyl monomer, such as a carbamate functional alkyl ester of methacrylic acid. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used.

In particular embodiments of the present invention, the monomer mixture used to prepare the acrylic polymer is essentially free of monomers that are reaction products of ethylenically unsaturated acids such as acrylic acid or methacrylic acid and epoxy functional materials such as glycidyl neodecanoate.

Generally any method of producing acrylic polymers that is known to those skilled in the art can be used to prepare the polymeric acrylic binder. For example, acrylic polymers can be prepared via aqueous emulsion polymerization techniques and used in the preparation of the aqueous coating compositions, or can be prepared via organic solution polymerization techniques. If the curable film-forming composition is to be waterborne, groups capable of salt formation such as acid or amine groups may be incorporated into the acrylic polymer. Upon neutralization of these groups with a base or acid the polymers can be dispersed into aqueous medium.

The amount of the polymeric acrylic binder (a) generally ranges from 10 to 90 percent by weight, or 20 to 80 percent by weight, or 30 to 60 percent by weight, based on the total weight of resin solids (curing agent plus all polymers containing functional groups) in the film-forming composition.

The curable film-forming compositions of the present invention further comprise (b) a curing agent containing functional groups that are reactive with the reactive functional groups on the polymeric acrylic binder. The curing agent (b) may be selected from, for example, polyisocyanates and aminoplasts. Mixtures of curing agents may also be used.

Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-eubstituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541, which is hereby incorporated by reference.

The aminoplast resins often contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol.

The polyisocyanate which is utilized as a crosslinking agent can be prepared from a variety of isocyanate-containing materials. Often, the polyisocyanate is a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures such as lower aliphatic alcohols including methanol, oximes such as methyl ethyl ketoxime, lactams such as caprolactam and pyrazoles such as dimethyl pyrazole.

Alternatively, the curing agent (b) comprises a polyisocyanate having free isocyanate functional groups and the curable film-forming composition is a two-package system. For curable film-forming compositions intended to cure at ambient temperatures, i. e., 30° C. or less, polyisocyanates having free isocyanate groups are often employed.

The polyisocyanate may include a single trifunctional polyisocyanate or a mixture of two or more different trifunctional polyisocyanates, and may be selected from one or more polyisocyanates such as triisocyanates including isocyanurates.

Suitable trifunctional isocyanates include, but are not limited to, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name CYTHANE 3160 by CYTEC Industries, Inc., DESMODUR N 3300, which is the isocyanurate of hexamethylene diisocyanate, DESMODUR N 3600, which is a trimer of hexamethylene diisocyanate, and DESMODUR Z 4470, a trimer of isophorone diisocyanate, all available from Bayer Corporation. Trimers of hexamethylene diisocyanate are used most often.

The polyisocyanate may also be any of those disclosed above, chain extended with one or more polyamines and/or polyols using suitable materials and techniques known to those skilled in the art.

The amount of the curing agent (b) generally ranges from 10 to 90 percent by weight, or 20 to 80 percent by weight, or 30 to 60 percent by weight, based on the total weight of resin solids (curing agent plus all polymers containing functional groups) in the film-forming composition.

The curable film-forming compositions of the present invention may further comprise at least one separate polymeric resin different from the polymeric acrylic binder (a) and having reactive functional groups. This separate resin is often selected from polyester resins, acrylic resins, and combinations thereof. Reactive functional groups may include any of those disclosed above with respect to the polymeric acrylic binder (a).

Suitable polyesters may be prepared in any known manner, for example, by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, which is often used, and trimellitic acid. Dimerized fatty acids may also be used to prepare soft polyester resins. Besides the polycarboxylic acids mentioned above, functional equivalents of the acids such as anhydrides where they exist or lower alkyl esters of the acids such as the methyl esters may be used.

As noted above, the separate polymeric resin may comprise a different acrylic polymer, prepared using any of the monomers disclosed above.

When used, the separate polymeric resin is typically present in the curable film-forming composition in an amount of 10 to 80 percent by weight, such as 20 to 60 percent by weight, or 40 to 60 percent by weight, based on the total weight of resin solids (curing agents and all polymers containing functional groups) in the curable film-forming composition. When the curable film-forming compositions is prepared as a two-package composition and a separate polymeric resin is included, the separate polymeric resin is usually present with the polymeric acrylic binder (a) and constitutes an amount of up to 10 percent by weight, based on the total weight of resin solids in the curable film-forming composition.

Other optional ingredients, such as colorants, catalysts, plasticizers, anti-oxidants, thixotropic agents, hindered amine light stabilizers, UV light absorbers and stabilizers may be formulated into the curable compositions of the present invention. These ingredients may be present (on an individual basis) in amounts up to 10 percent, often from 0.1 to 5 percent by weight based on total weight of resin solids of the film-forming composition. When the composition of the present invention includes aminoplast curing agents, catalysts including add functional catalysts known to those skilled in the art as useful in aminoplast-cured compositions, such as para-toluenesulfonic add, dodecylbenzene sulfonic acid, and the like, may be included as well.

The curable film-forming compositions of the present invention are often used as transparent, colorless topcoats (clear coats) over colored base coats, but can also include a colorant and be applied to a substrate as a monocoat. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ('DP-PBO red'), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004.

In general, the colorant can be present in the coating composition in any amount sufficient to impart the desired property, visual and/or color effect. When present, the colorant may comprise from 1 to 65 weight percent of the present compositions, such as from 3 to 40 weight percent or 5 to 35 weight percent, with weight percent based on the total weight of the compositions.

The curable film-forming compositions of the present invention may alternatively be used as a clear coat layer of a multi-layer composite coating composition, such as a color-plus-clear composite coating. In accordance with the present invention, a multilayer coated substrate is provided comprising: a substrate; a colored basecoat applied to at least a portion of a surface of the substrate; and a clearcoat applied to at least a portion of the basecoat. The clearcoat is deposited from the curable film-forming composition described above.

The compositions of the present invention may be applied over any of a variety of substrates such as metallic, glass, wood, and/or polymeric substrates, and can be applied by conventional means including but not limited to brushing, dipping, flow coating, spraying and the like. They are most often applied by spraying. The usual spray techniques and equipment for air spraying, airless spraying, and electrostatic spraying employing manual and/or automatic methods can be used. Suitable substrates include but are not limited to metal substrates such as ferrous metals, zinc, copper, magnesium, aluminum, aluminum alloys, and other metal and alloy substrates typically used in the manufacture of automobile and other vehicle bodies. The ferrous metal substrates may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used.

The compositions of the present invention may also be applied over elastomeric or plastic substrates such as those that are found on motor vehicles. By "plastic" is meant any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like.

Suitable basecoats may include any of those known in the art of surface coatings, and may be selected based on the cure temperature being employed.

The basecoat and the clearcoat applied on top of the basecoat may be applied by any conventional coating technique, including, but not limited to, any of those disclosed above. The transparent topcoat can be applied to a cured or to a dried basecoat before the basecoat has been cured. In the latter instance, the two coatings can then be heated to cure both coating layers simultaneously.

The present invention is more particularly described in the following examples, which are intended to be illustrative only, since numerous modifications and variations therein will be apparent to those skilled in the art. Unless otherwise specified, all parts and percentages are by weight.

Example A

An acrylic resin was prepared in accordance with the present invention in the following manner:

To a 5 Liter, 4-neck round-bottom flask equipped with a mechanical stirrer and a reflux condenser, were added 870.2 grams of SOLVESSO 100 (Naphtha (Petroleum) solvent, commercially available from Exxon-Mobil Chemical). The contents of the flask were heated to reflux under a nitrogen atmosphere with a 170° C. set-point. At an initial reflux temperature of 164.2° C., a mixture of 186.4 grams of SOLVESSO 100 and 88.7 grams of LUPEROX® DTA (available from Arkema Inc.) was added to the reaction flask over 210 minutes. Beginning at the same time as the above addition, a mixture of 382.5 grams of 2-hydroxyethyl methacrylate, 410.4 grams of 2-ethylhexyl acrylate, 360.1 grams of glycidyl methacrylate, 621.0 grams of styrene, and 34.8 grams of SOLVESSO 100 was added to the reaction flask over 180 minutes. Upon completion, the above additions were rinsed with 21.8 grams and 34.9 grams of SOLVESSO 100, respectively, and the mixture was held at reflux for 1 hour. After the hold, the mixture was cooled to about 129° C., and 309.2 grams of benzoic acid was added and rinsed with 21.8 grams of SOLVESSO 100. The mixture was heated to 170° C. and held for 1 hour. After the hold, the mixture was cooled and poured out. The resulting acrylic resin had a measured percent solids (110° C./1 hr) of about 65.5%, a Gardner-Holt viscosity of Z+, an acid value of 2.24 mg KOH/g sample, a hydroxyl value of 95.2 mg KOH/g sample, and an epoxy equivalent weight of 37,763 grams/ equivalent. Gel permeation chromatography was used with tetrahydrofuran solvent and polystyrene standards to determine a weight average molecular weight of 3547 for the resin.

Example B (Comparative)

An acrylic resin was prepared as in Example 1, with salicylic acid substituted for benzoic acid.

The following formulation examples demonstrate the preparation of curable film-forming compositions. Example 1 demonstrates the preparation of curable film-forming compositions according to the present invention using the acrylic resin of Example A above. Example 2 is comparative, prepared using the acrylic resin of Example B above. Both are compared to a control formulation. The ingredients in the following lists were mixed together:

|  | Control | Example 1 | Example 2 (Comparative) |
| --- | --- | --- | --- |
| SOLVESSO 150[1] | 10.9 g | 10.9 g | 10.9 g |
| SOLVESSO 100[2] | 4 g | 4 g | 4 g |
| Butanol | 12 g | 12 g | 12 g |
| TINUVIN 123[3] | 0.5 g | 0.5 g | 0.5 g |
| EVERSORB 93[4] | 0.6 g | 0.6 g | 0.6 g |
| EVERSORB 928[5] | 1.5 g | 1.5 g | 1.5 g |
| Acrylic polyol[6] | 85.5 g |  |  |
| Example B |  |  | 85.5 g |
| Example A |  | 85.5 g |  |
| WORLEE ADD 315[7] | 0.7 g | 0.7 g | 0.7 g |
| DISPARLON OX 60[8] | 0.15 g | 0.15 g | 0.15 g |
| CYMEL 202[9] | 30.1 g | 30.1 g | 30.1 g |
| DDBSA | 0.45 g | 0.45 g | 0.45 g |

[1]Naphtha (Petroleum) solvent, commercially available from Exxon-Mobil Chemical
[2]Heavy aromatic Naphtha (Petroleum) solvent, commercially available from Exxon-Mobil Chemical
[3]UV light stabilizer available from BASF
[4]HALS available from Everlight Chemical
[5]a benzotriazole UV light absorber available from Everlight Chemical
[6]Acrylic polyol prepared as in Example A, using 30.3% styrene, 19.9% hydroxyethyl methacrylate, 28.7% glycidyl neodecanoate, 11.0% acrylic acid, and 10.1% 2-ethylhexyl acrylate
[7]a water soluble silicone paint additive, commercially available from Worlee-Chemie G.m.b.H.
[8]a surface control agent based on an acrylic polymer. Available from King Industries Specially Chemicals
[9]Available from Cytec Industries Inc.

The film forming compositions were spray applied to a pigmented basecoat to form color-plus-clear composite coatings over primed electrocoated steel panels. The panels used were ACT cold roll steel panels (10.16 cm by 30.48 cm) with ED6060 electrocoat available from ACT Laboratories, Inc. Separate panels were coated with an ENVIROBASE High Performance (EHP) pigmented water-borne basecoat, available from PPG Industries, Inc. Black EHP T407 was hand sprayed using a SATAjet 3000 with WSB fluid nozzle at ambient temperature (about 70° F. (21° C.)). A dry film thickness of about 0.3 to 0.8 mils (about 7 to 20 micrometers) was targeted for the basecoat. The basecoat panels were allowed to flash at ambient temperature (about 70° F. (21° C.)) for at least 15 minutes prior to clearcoat application.

The coating compositions were each hand sprayed using a Devilbiss GTi HVLP spray gun to a basecoated panel at ambient temperature in two coats with an ambient flash between applications. Clearcoats were targeted for a 1 to 2 mils (about 25 to 51 micrometers) dry film thickness. AN coatings were allowed to cure at ambient temperature or air flash for about 20 minutes before being baked. The optional bake was for thirty minutes at 140° F. (60° C.). Table 1 below illustrates the properties of each.

TABLE 1

| | 20° gloss | 60° gloss | Haze | Fischer Micro Hardness | 9μ scratch resistance | Solids | 6000 hours 340 QUV | 6000 hrs. WEATHEROMETER | Opel Etch test* |
|---|---|---|---|---|---|---|---|---|---|
| Control | 94 | 96 | 46 | 150 | 30% retention | 43.4% | 94% gloss retention | 91% gloss retention | 1 |
| Example 1 | 98 | 99 | 45 | 172 | 24% retention | 40% | 97% gloss retention | 94% gloss retention | 0 |
| Example 2 (Comp) | 94 | 97 | 45 | 148 | 25% retention | 43.8% | 23% gloss retention - cracking | 43% gloss retention - mud crack** | 0 |

*A solution of 38% sulfuric acid in deionized water is prepared and applied in 50 microliter droplets onto coated test panels. The droplets are then covered with scintillation vial (20 ml) lids to deter evaporation of the acid droplets. The panels are stored flat at ambient temperature and humidity. One test panel is examined every 24 hours by removing the lid, rinsing with deionized water, and carefully blotting dry. Acid resistance is rated on a scale of 0 to 5, with 0 = no visible etching and 5 = large blisters/swelling/softening.
**Comparative Example 2 showed extreme failure with notable cracking throughout film.

The coating composition of the present invention, illustrated in Example 1, showed acid etch resistance better than the control and excellent durability. The comparative Example 2, prepared using salicylic acid, showed good etch resistance but very poor durability.

The present invention has been described with reference to specific details of particular embodiments thereof. It is not intended that such details be regarded as limitations upon the scope of the invention except insofar as and to the extent that they are included in the accompanying claims.

We claim:

1. A curable film-forming composition comprising:
   (a) a polymeric acrylic binder having reactive functional groups, wherein the polymeric acrylic binder is prepared from an ethylenically unsaturated, epoxy functional monomer that is reacted with benzoic acid; and
   (b) a curing agent containing functional groups that are reactive with reactive functional groups on the polymeric acrylic binder.

2. The curable film-forming composition of claim 1, wherein epoxy functional groups on the epoxy functional monomer are reacted with the benzoic acid after preparation of the polymeric acrylic binder.

3. The curable film-forming composition of claim 1, wherein epoxy functional groups on the epoxy functional monomer are reacted with the benzoic acid prior to preparation of the polymeric acrylic binder.

4. The curable film-forming composition of claim 1, wherein the reactive functional groups on the polymeric acrylic binder (a) are selected from hydroxyl groups, carbamate groups, carboxyl groups, isocyanate groups, carboxylate groups, primary amine groups, secondary amine groups, amide groups, urea groups, urethane groups, epoxy groups, and combinations thereof.

5. The curable film-forming composition of claim 1, wherein the epoxy functional monomer comprises glycidyl methacrylate.

6. The curable film-forming composition of claim 5, wherein an aromatic, hydroxyl functional repeat unit is formed on the polymeric acrylic binder (a) upon reaction of epoxy functional groups on the epoxy functional monomer with the benzoic acid, and wherein at least 20 percent by weight of the polymeric acrylic binder (a) comprises the repeat unit.

7. The curable film-forming composition of claim 6, wherein up to 50 percent by weight of the polymeric acrylic binder (a) comprises the repeat unit.

8. The curable film-forming composition of claim 1, wherein the curing agent (b) is selected from polyisocyanates, aminoplasts, and combinations thereof.

9. The curable film-forming composition of claim 8, wherein the curing agent (b) comprises a polyisocyanate having free isocyanate functional groups and the curable film-forming composition is a two-package system.

* * * * *